United States Patent [19]

Harvey

[11] Patent Number: 4,875,638
[45] Date of Patent: Oct. 24, 1989

[54] FILM CASSETTE

[75] Inventor: Donald M. Harvey, Webster, N.Y.

[73] Assignee: Eastman Kodak Company, Rochester, N.Y.

[21] Appl. No.: 296,558

[22] Filed: Jan. 12, 1989

[51] Int. Cl.$^4$ .............................................. G03B 17/26
[52] U.S. Cl. ..................................... 242/71.1; 354/275
[58] Field of Search ....................... 242/71, 71.1, 71.8, 242/71.9; 354/275

[56] References Cited

U.S. PATENT DOCUMENTS

| 1,685,010 | 9/1928 | Thornton. | |
|---|---|---|---|
| 3,467,314 | 9/1969 | Roman. | |
| 4,176,938 | 12/1979 | Weiss et al. | 354/275 |
| 4,395,107 | 7/1983 | Luhrig et al. | |

Primary Examiner—Stuart S. Levy
Assistant Examiner—Steven M. duBois
Attorney, Agent, or Firm—Roger A. Fields

[57] ABSTRACT

A film cassette is disclosed wherein a film retention member located along a film passage slit is adapted to enter a trapping perforation in a leader portion of the filmstrip to secure the leader portion in the slit portion to the initial advance of the filmstrip from the cassette shell. A trailing end portion of the filmstrip has a cut-out which enables the filmstrip to fall away from a support for normally positioning the filmstrip within range of the retention member, when the filmstrip is advanced sufficiently from the cassette shell to move the cut-out to the support.

9 Claims, 5 Drawing Sheets

FILM CASSETTE

CROSS-REFERENCE TO RELATED APPLICATIONS

Reference is made to commonly assigned copending applications Ser. No. 173,396, entitled FILM CASSETTE, and file Mar. 25, 1988 in the names of Jeffrey C. Robertson and Mark D. Fraser, and Ser. No. 193,323, entitled FILM CASSETTE, and filed May 12, 1988 in the name of Jeffrey C. Robertson.

Also, reference is made to commonly assigned copending applications Ser. No. 296,466, entitled FILM CASSETTE, and filed on the same day as this application in the name of David E. Beach, and Ser. No. 296,473, entitled FILM CASSETTE, and filed on the same day as this application in the name of Donald M. Harvey.

BACKGROUND OF THE INVENTION

1. Field of the Invention

The invention relates generally to the field of photography and particularly to a film cassette containing roll film.

2. Description of the Prior Art

In conventional 35 mm film manufacturers' cassettes, such as manufactured by Eastman Kodak Co. and Fuji Photo Film Co., Ltd., the filmstrip is wound on a flanged spool which is rotatably supported within a cylindrical shell. A leading or forward-most portion of the filmstrip approximately 2⅜ inches long, commonly referred to as a "film leader", protrudes from a light-trapped slit or mouth of the cassette shell. One end of the spool has a short axial extension which projects from the shell, enabling the spool to be turned by hand. If the spool is initially rotated in an unwinding direction, the film roll inside the shell will tend to expand radially since the inner end of the filmstrip is attached to the spool, and the fogged leader portion protruding from the slit will remain stationary. The film roll can expand radially until a non-slipping relation is established between its outermost convolution and the inner curved wall of the shell. Once this non-slipping relation exists, there is a binding effect between the film roll and the shell which prevents further rotation of the spool in the unwinding direction. Thus, rotation of the spool in the unwinding direction cannot serve to advance the filmstrip out of the shell, and it is necessary in the typical 35 mm camera to engage the protruding leader portion to draw the filmstrip out of the shell.

A 35 mm film cassette has been proposed which, unlike conventional film cassettes, includes a film leader that does not extend outside the cassette shell. The film leader, instead, is located entirely within the cassette shell. Specifically, in U.S. Pat. No. 4,423,943, granted Jan. 3, 1984, there is disclosed a film cassette wherein the outermost convolution of the film roll wound on the film spool is radially constrained by respective circumferential lips of two axially spaced flanges of the spool to prevent the outermost convolution from contacting an inner wall of the cassette shell. The trailing end of the filmstrip is secured to the film spool. The forward or leading end of the filmstrip is reduced in width to allow it to protrude from between the circumferential lips and rest against the shell wall at a location inwardly of a film passageway to the outside of the cassette shell. During initial unwinding rotation of the film spool, the leading end of the filmstrip is advanced into and through the film passageway in order to exit the cassette shell. The passageway has a width that is slightly less than the width of the filmstrip, thus resulting in the filmstrip being transversely bowed as it is uncoiled from the film spool, and thereby facilitating movement of the film edges under the circumferential lips of the respective flanges. However, transverse bowing of the filmstrip to move its edges under the circumferential lips results in increased friction between the filmstrip and the cassette structure which will impede advance of the filmstrip from the cassette shell and may damage the filmstrip.

THE CROSS-REFERENCED APPLICATIONS

Like the type of film cassette disclosed in U.S. Pat. No. 4,423,923, cross-referenced applications Ser. Nos. 173,396 and 193,323 each disclose a film cassette that contains a non-protruding film leader which is automatically advanced into and through a film passageway to the outside of the cassette shell in response to initial rotation of the film spool in the unwinding direction.

Specifically, there is disclosed a film cassette wherein a convoluted film roll is wound on a spool between a pair of coaxially spaced, independently rotatable flanges. The two flanges have respective circumferential annular lips which prevent the outermost convolution of the film roll from clock-springing into contact with the cassette shell. When the spool is initially rotated, the flanges may remain substantially stationary and the film roll, since its inner end is secured to the spool, tends to expand radially to ensure a non-slipping relation between the outermost convolution and the annular lips. Once the nonslipping relation exists, rotation of the spool will rotate the flanges. This allows stationary internal spreaders to deflect successive portions of the annular lips to an axial dimension exceeding the film width, in turn allowing corresponding portions of the outermost convolution to exit from the radial confinement of the lips without damaging the filmstrip, and to advance into and through a film passageway to the outside of the cassette shell.

THE PROBLEM

In the film cassette disclosed in U.S. Pat. No. 4,423,923 and the ones disclosed in cross-referenced applications Ser. Nos. 173,396 and 193,323, the forward or leading end of the film leader normally is located inwardly of the film passageway. When the film spool is rotated in the unwinding direction, the leading end is required to "seek" an entrance to the film passageway in order to move into and through the passageway to the outside of the cassette shell. Alternatively, in the film cassettes disclosed in the two cross-referenced applications, the leading end could initially be positioned within the film passageway (rather than inwardly of the passageway). However, because of the possibility of casual backward creep of the film leader due to vibration during shipping, for example, the leading end might fall out of the film passageway.

If, with these film cassettes, the filmstrip is rewound midroll into the cassette shell, i.e., before all of the available frame areas are exposed, because the photographer wishes to change the film type, the film leader will be returned to its original location inwardly of the film passageway. Thus, in order to re-use the filmstrip to expose its remaining frame areas, the leading end of the film leader will be required to seek the entrance to the film passageway in order to exit the cassette shell.

SUMMARY OF THE INVENTION

The invention solves the problems described above by providing an improved film cassette wherein a film spool having a filmstrip coiled about it is rotatable to advance the filmstrip through a film passage slit to the outside of the cassette shell and to return the filmstrip through the slit to the inside of the cassette shell, and wherein the improvement comprises:

film securement means disposed along the film passage slit for engaging a leader portion of the filmstrip when the filmstrip is returned to the inside of the cassette shell;

film support means located proximate the film securement means for supporting the filmstrip within range of the film securement means to permit the securement means to engage the leader portion; and a trailing portion of the filmstrip, remote from the leader portion, being configured to enable the filmstrip to fall away from the film support means to move out of range of the film securement means when the filmstrip is advanced sufficiently from the cassette shell to position the trailing portion at the film support means, whereby the film securement means cannot engage the leader portion when the filmstrip is returned to the inside of the cassette shell.

With this invention, therefore, the leader portion can advantageously be secured in the film passage slit prior to initial advance of the filmstrip from the cassette shell and following midroll return of the filmstrip to the cassette shell. However, when the filmstrip is completely exposed and returned to the cassette shell, the leader portion cannot be secured in the film passage slit because the filmstrip will have fallen out of range of the film securement means. Thus, the leader portion will be wound onto the film spool.

According to a preferred embodiment of the invention, there is provided an improved film cassette wherein a film retention member located along a film passage slit is adapted to enter a trapping perforation in a leader portion of the filmstrip to secure the leader portion in the slit prior to initial advance of the filmstrip from the cassette shell or following midroll return of the filmstrip to the cassette shell. A trailing end portion of the filmstrip has a cut-out which enables the filmstrip to fall away from a support for normally positioning the filmstrip within range of the retention member, when the filmstrip is advanced sufficiently from the cassette shell to move the cutout to the support. The support includes an exposure-completed indicator that is normally covered by the filmstrip and therefore is not visible through a window in the cassette shell. When the filmstrip falls away from the support, the indicator is uncovered and can be viewed through the window. Further details of the exposure-completed indicator are disclosed in cross-referenced application Ser. No. 296,473.

DETAILED DESCRIPTION OF THE PREFERRED EMBODIMENT

The invention is disclosed as being embodied preferably in a 35 mm film cassette. Because the features of this type of film cassette are generally well known, the description which follows is directed in particular to elements forming part of or cooperating directly with the disclosed embodiment. It is to be understood, however, that other elements not specifically shown or described may take various forms known to persons of ordinary skill in the art.

Figure 1:
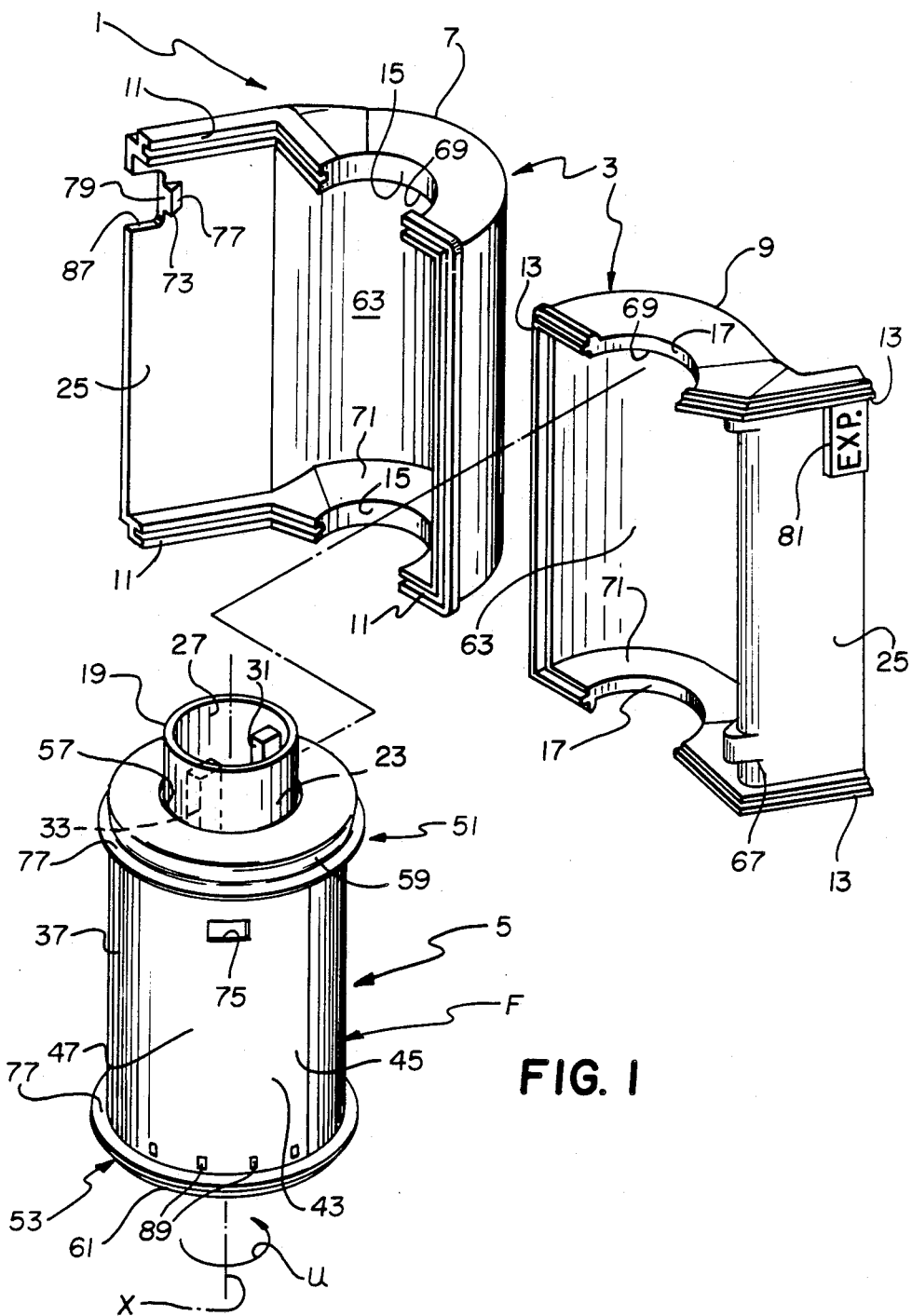
FIG. 1 is an exploded perspective view of an improved film cassette according to a preferred embodiment of the invention.
Figure 2:
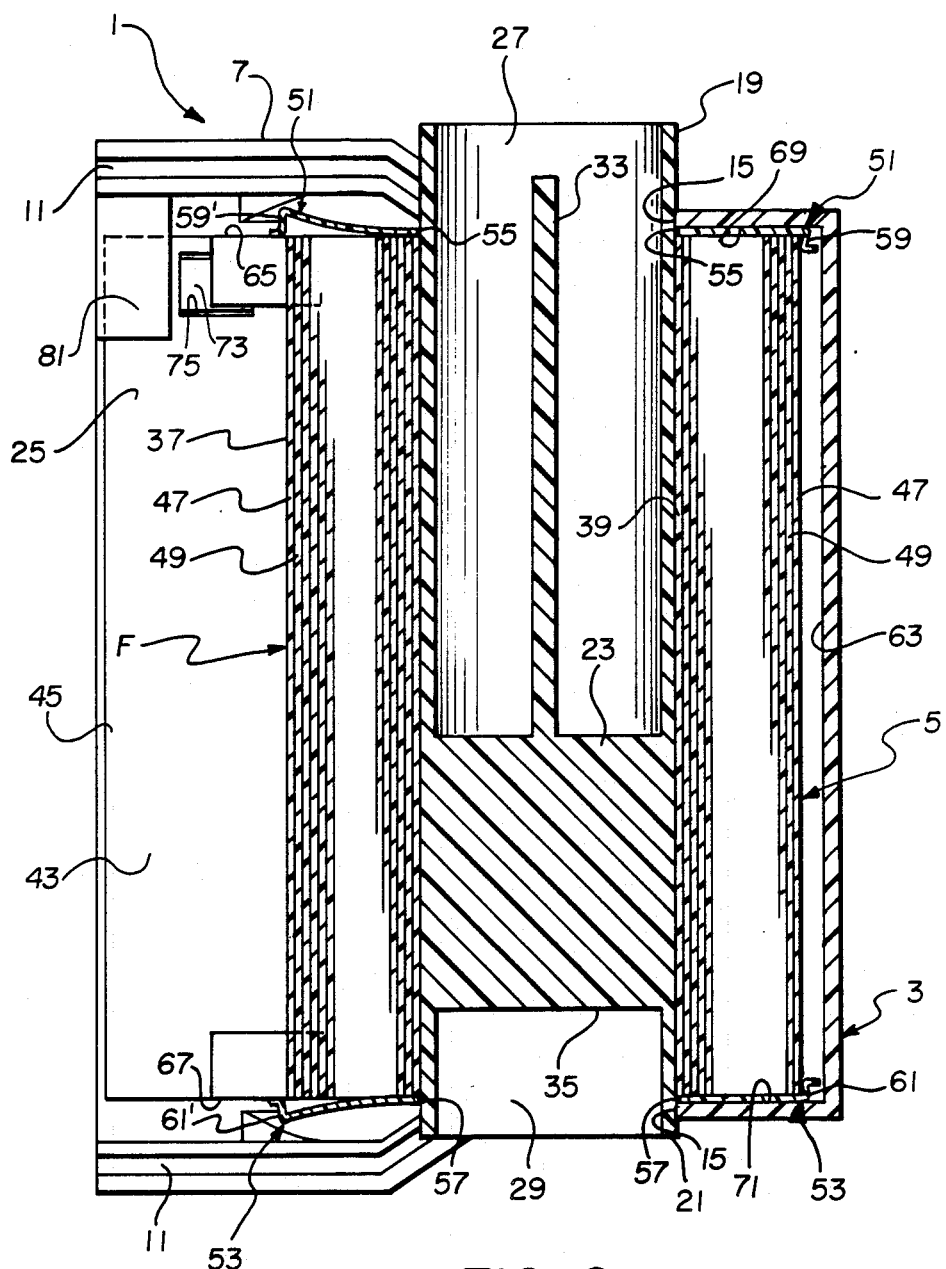
FIG. 2 is an elevation view in cross-section of the improved film cassette.
Figure 3:
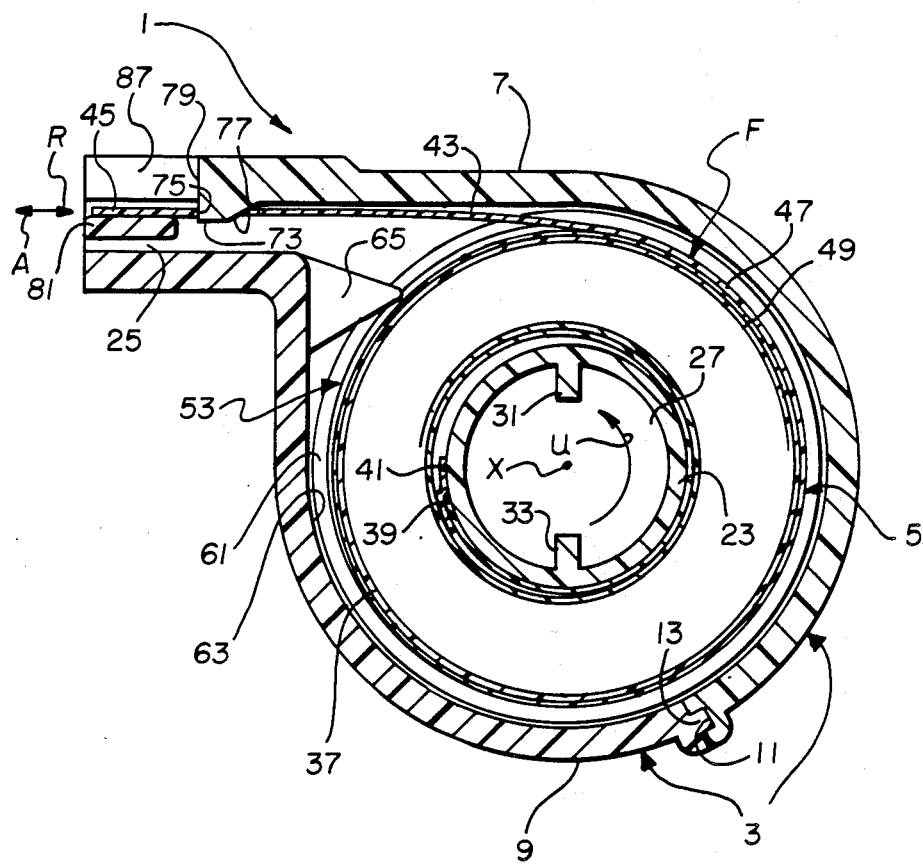
FIG. 3 is an end view in cross-section of the improved film cassette, showing a leader portion of the filmstrip engaged by a film retention member located along a film passage slit to the outside of the cassette shell.

Referring now to the drawings, FIGS. 1-3 depict an improved 35 mm film cassette 1 comprising a light-tight cassette shell 3 and a film spool 5 rotatable about an axis X within the cassette shell. The cassette shell 3 consists of two shell halves 7 and 9 which are mated along respective grooved and stepped edge portions 11 and 13. The mated halves 7 and 9 define upper and lower aligned openings 15 and 17 for relatively longer and shorter opposite end extensions 19 and 21 of a spool core or hub 23. Also, they define a light-trapped film passage slit or mouth 25. The light-trapping means for preventing ambient light from entering the film passage slit 25, although not shown, may be a known velvet or plush material which lines the interior of the slit.

The spool core 23 as shown in FIGS. 1-3 includes relatively longer and shorter coaxial holes 27 and 29 opening at the respective longer and shorter opposite end extensions 19 and 21 of the spool core. A pair of spaced keying ribs 31 and 33 integrally formed with the spool core 23 are located within the longer coaxial hole 27, and a single keying rib 35 similarly formed with the spool core is located within the shorter coaxial hole 29. The several keying ribs 31, 33, and 35 according to custom may be engaged to rotate the film spool in an unwinding direction U or to rotate the spool in a winding direction opposite to the unwinding direction. See FIG. 1.

A roll 37 of convoluted 35 mm film F is wound about the spool core 23. As indicated in FIG. 3, the film roll 37 has an inner or trailing end portion 39 attached to the spool core 23 by a suitable piece of adhesive tape 41 and a film leader or leader portion 43. The film leader 43 has a leading or forward end 45 and comprises 2-3 convolutions of the film roll 37. One of these leader convolutions is the outermost convolution 47 and another of them is the next inward succeeding convolution 49.

A pair of flexible identical disks 51 and 53 are coaxially spaced along the spool core 23 to lightly rest against the opposite ends of the film roll 37. The two disks 51 and 53 cover the opposite ends of the film roll 37 and they have respective central holes 55 and 57 through which the spool core 23 longitudinally extends to permit rotation of the spool core relative to the disks. Although not shown, it is possible for the spool core 23 to include integral radially extending flanges disposed between the opposite ends of the film roll 37 and the respective disks 51 and 53. The two disks 51 and 53 have respective continuous circumferential lips 59 and 61 which extend at right angles to the peripheries of the disks to radially confine the outermost convolution 47 of the film roll 37, thereby to prevent the film roll from radially expanding or clock-springing into contact with an inner wall 63 of the cassette shell 3. As shown in FIGS. 2 and 3, the film leader 43 initially protrudes from between limited sections 59' and 61' of the respective lips 59 and 61 and into the film passage slit 25.

A pair of rigid identical spreader surfaces 65 and 67 are fixed to the cassette half 9 at separate locations inwardly of the film passage slit 25 as shown in FIGS. 1-3. The two spreader surfaces 65 and 67 deflect the opposite limited sections 59' and 61' of the two lips 59 and 61 axially away from each other to an axial dimension slightly exceeding the film width. See FIG. 2. In essence, the deflected sections 59' and 61' of the two lips 59 and 61 are axially spaced sufficiently to prevent those sections of the lips from radially confining corresponding sections of the outermost convolution 47 of the film roll 37. As indicated in FIGS. 1 and 2, the remaining portions of the two lips 59 and 61 are maintained in place by inner semi-circular flat surfaces 69 and 71 of the cassette shell 3 which abut the respective disks 51 and 53, except in the vicinity of the two spreader surfaces 65 and 67. Thus, the remaining portions of the two lips 59 and 61 continue to radially confine the outermost convolution 47.

Figure 4:
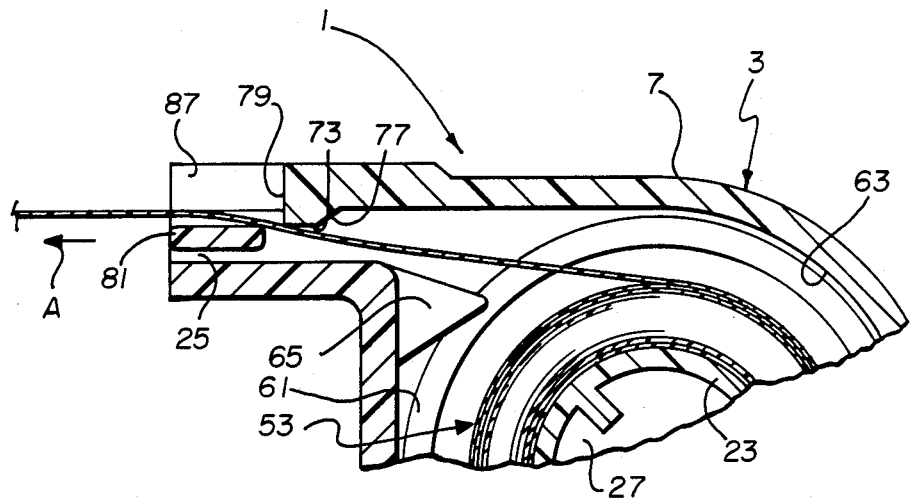
FIG. 4 is a partial end view similar to FIG. 3, showing the filmstrip during film advance from the cassette shell.
Figure 7:
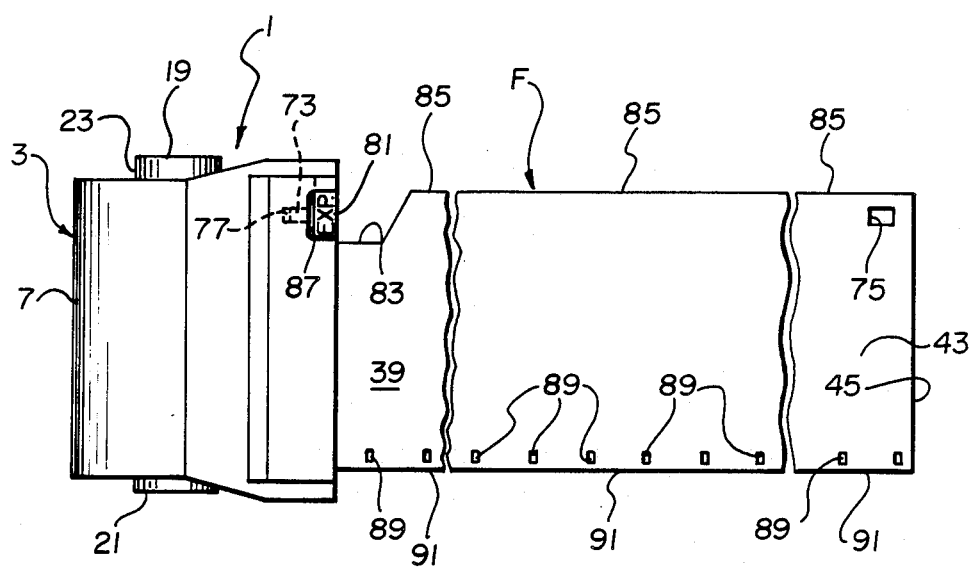
FIG. 7 is a plan view of the film cassette and the filmstrip.

In FIGS. 1, 3, and 7, it can be seen that the cassette half 7 includes an integral film retention member 73 disposed along the film passage slit 25 to enter a trapping perforation 75 in the film leader 43 in order to secure the film leader in the slit prior to initial advance of the filmstrip F from the cassette shell 3 or following midroll return of the filmstrip F to the cassette shell. The retention member 73 is ramped along its surface 77 relative to the direction A the filmstrip is to be advanced through the slit 25 to the outside of the cassette shell 3, to allow disengagement of the film leader 43 from the retention member in response to movement of the filmstrip in that direction. See FIGS. 3 and 4. Also, the retention member 73 is configured (vertically in FIG. 3) along its surface 79 relative to the direction R the filmstrip F is to be returned through the slit 25 to the inside of the cassette shell 3, to prevent disengagement of the film leader 43 from the retention member should the filmstrip be urged to move in that direction rather than in the direction A.

A flat film support 81, shown in FIGS. 1-3 and 7, is located proximate the film retention member 73 for supporting the filmstrip F within range of the retention member to permit the retention member to engage the film leader 43. The trailing end portion 39 of the filmstrip F has a reduced width, effected by a cut-out 83 along the longitudinal film edge 85, that enables the filmstrip to fall away from the film support 81 to move out of range of the retention member 73 when the filmstrip is advanced sufficiently in the direction A from the cassette shell 3 to move the cut-out to the support. See FIGS. 5 and 7. The film support 81 includes an exposure-completed indicator "EXP." that is normally covered by the filmstrip F and therefore is not visible through a window or opening 87 in the cassette half 7. When the filmstrip F falls away from the film support 81, the indicator "EXP." is uncovered and can be viewed through the window 87 as shown in FIG. 7. The indicator "EXP." thus serves as a double exposure prevention warning. Further details of the indicator "EXP." are disclosed in cross-referenced Ser. No. 296,473.

The filmstrip F includes a conventional series of metering perforations 89 extending proximate the longitudinal film edge 91. The metering perforations 89 are not located proximate the longitudinal film edge 85 in order to avoid interference with the trapping perforation 75 and the cut-out 83. See FIG. 7.

OPERATION

When the spool core 23 is initially rotated in the unwinding direction U, the two disks 51 and 53 may remain substantially stationary and the film roll 37, since its trailing end portion 39 is attached to the spool core, tends to expand radially to ensure a non-slipping relation between the outermost convolution 47 of the film roll and the circumferential lips 59 and 61 of the disks. See FIGS. 2 and 3. Then, rotation of the spool core 23 in the same direction will similarly rotate the two disks 51 and 53. As a result, the two spreader surfaces 65 and 67 will deflect successive sections 59' and 61' of the circumferential lips 59 and 61 axially away from each other as the respective sections are rotated past the spreader surfaces. The deflected sections 59' and 61' of the two lips 59 and 61 are returned to their original non-flexed condition by the semi-circular flat surfaces 69 and 71. As can be appreciated from FIGS. 3 and 4, the outermost convolution 97 of the film roll 37 will be freed from the radial confinement of the two lips 59 and 61 in the vicinity of the two spreader surfaces 65 and 67, thereby allowing the film leader 43 to be advanced in the direction A out of engagement with the film retention member 73 and to the outside of the cassette shell 3. Then, each successive rotation of the spool core 23 in the unwinding direction U will advance a corresponding section of the filmstrip F from the cassette shell 3.

Figure 5:
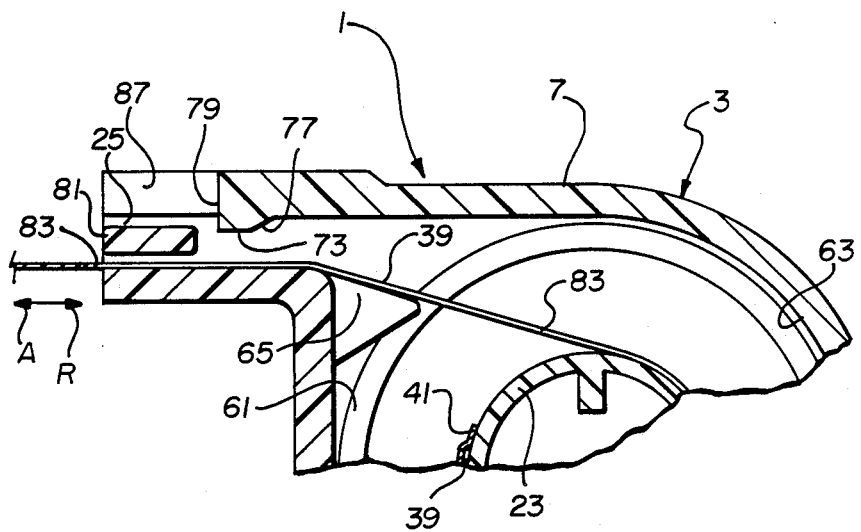
FIG. 5 is a partial end view similar to FIG. 3, showing the filmstrip after it falls away from a support member for supporting the filmstrip within range of the retention member.
Figure 6:
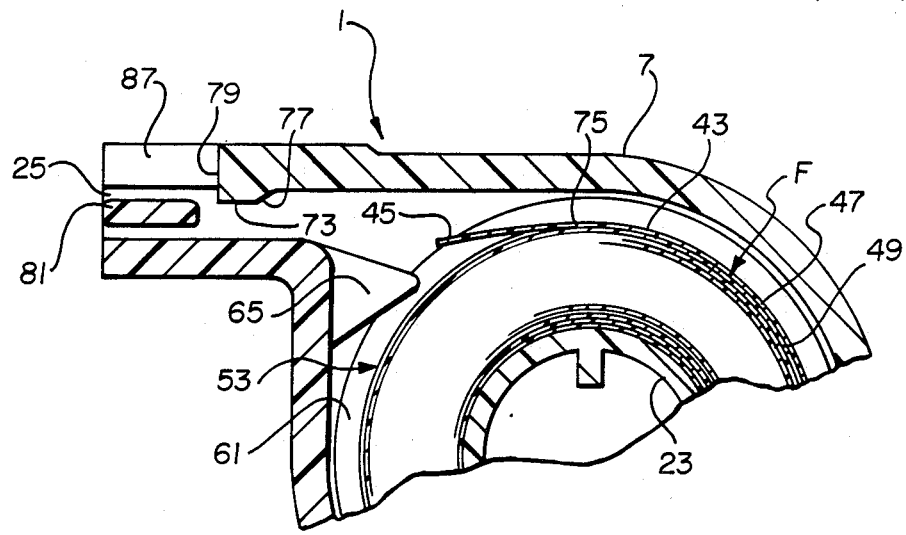
FIG. 6 is a partial end view similar to FIG. 3, showing the filmstrip after it is rewound completely into the cassette shell.

When the filmstrip F is advanced sufficiently from the cassette shell 3 to move the cut-out 83 of the trailing end portion 39 to the film support 81, the filmstrip will slip below the film support as shown in FIG. 5, thereby uncovering the indicator "EXP." During return of the filmstrip F in the direction R, the filmstrip F will be located below the film support 81. Thus, it will be maintained out of range of the film retention member 73. This prevents the film leader 43 from being engaged by the retention member 73 and allows the film leader (for the first time) to be wound onto the spool core 23.

If the filmstrip F is returned midroll to the cassette shell 3, i.e. before all of the available frame areas are exposed, it will not have had the opportunity to slip below the film support 81. Thus, the filmstrip F will continue to cover the indicator "EXP." and it will remain in range of the film retention member 73, permitting the film leader 43 to be re-engaged by the retention member as shown in FIG. 3.

The invention has been described with reference to a preferred embodiment. However, it will be appreciated that variations and modifications can be effected within the ordinary skill in the art without departing from the scope of the invention.

I claim:

1. An improved film cassette wherein a film spool having a filmstrip coiled about it is rotatable to advance said filmstrip through a film passage slit to the outside of the cassette shell and to return the filmstrip through said film passage slit to the inside of said cassette shell, and wherein the improvement comprises:

film securement means disposed along said film passage slit for engaging a leader portion of said filmstrip when the filmstrip is returned to the inside of said cassette shell;

film support means located proximate said film securement means for supporting said filmstrip within range of the film securement means to permit the securement means to engage said leader portion; and a trailing portion of said filmstrip, remote from said leader portion, being configured to enable the filmstrip to fall away from said film support means to move out of range of said film securement means when the filmstrip is advanced sufficiently from said cassette shell to position said trailing portion at the film support means, whereby said film securement means cannot engage said leader portion when said filmstrip is returned to the inside of said cassette shell.

2. The improvement as recited in claim 1, wherein said film support means is disposed to extend partially widthwise of said filmstrip to support the filmstrip, and said trailing portion of the filmstrip has a reduced width which enables the filmstrip to fall away from said film support means.

3. The improvement as recited in claims 1 or 2, further comprising:

exposure-completed indicator means positioned on said film support means to be uncovered by said filmstrip when the filmstrip falls away from the film support means; and window means defining an opening in said cassette shell for permitting said indicator means to be viewed when it is not covered by said filmstrip.

4. The improvement as recited in claim 2, wherein said leader portion of the filmstrip includes a trapping perforation, and said film securement means includes a film retention member adapted to enter said trapping perforation to engage said leader portion.

5. The improvement as recited in claim 4, wherein said film retention member is ramped relative to a direction said filmstrip is advanced through said film passage slit to the outside of said cassette shell to allow disengagement of said leader portion of the filmstrip from the film retention member in response to movement of the filmstrip in that direction, but is configured relative to a direction said filmstrip is returned through said film passage slit to the inside of said cassette shell to prevent disengagement of said leader portion from said film retention member should said filmstrip be urged to move in that direction.

6. The improvement as recited in claim 4, wherein the reduced width of the trailing portion of said filmstrip is effected by a cut-out in one longitudinal edge of the filmstrip, said trapping perforation of the leader portion of said filmstrip is located proximate the same longitudinal edge, and said filmstrip includes a series of metering perforations extending proximate another longitudinal edge of the filmstrip.

7. An improved film cassette wherein a film spool having a filmstrip coiled about it is rotatable to advance said filmstrip through a film passage slit to the outside of the cassette shell and to return the filmstrip through said film passage slit to the inside of said cassette shell, and wherein the improvement comprises:

film securement means disposed along said film passage slit for engaging a leader portion of said filmstrip prior to initial advance of the filmstrip to the outside of said cassette shell or following return of the filmstrip to the inside of the cassette shell;

film support means located proximate said film securement means for supporting said filmstrip within range of the film securement means to permit the securement means to engage said leader portion; and a trailing end portion of said filmstrip having a cut-out which enables the filmstrip to fall away from said film support means to move out of range of said film securement means when the filmstrip is advanced sufficiently from said cassette shell to position said cut-out at the film support means, whereby said film securement means cannot engage said leader portion when said filmstrip is returned to the inside of said cassette shell.

8. The improvement as recited in claim 7, further comprising:

exposure-completed indicator means positioned on said film support means to be uncovered by said filmstrip when the filmstrip falls away from the film support means; and window means defining an opening in said cassette shell for permitting said indicator means to be viewed when it is not covered by said filmstrip.

9. An improved web container wherein a spool having a web material coiled about it is rotatable to advance said web material through a web passage slit to the outside of the container and to return the web material through said web passage slit to the inside of said container and wherein the improvement comprises:

web securement means disposed along said web passage slit for engaging a leading portion of said web material when the web material is returned to the inside of said container;

web support means located proximate said web securement means for supporting said web material within rage of the web securement means to permit the securement means to engage said leading web portion; and a trailing portion of said web material remote from said leading web portion being configured to enable the web material to fall away from said web support means to move out of range of said web securement means when the web material is advanced sufficiently from said container to position said trailing web portion at the web support means, whereby said web securement means cannot engage said leading web portion when said web material is returned to the inside of said container.

* * * * *